(12) United States Patent
Barry et al.

(10) Patent No.: US 10,545,915 B2
(45) Date of Patent: Jan. 28, 2020

(54) RECURSIVE MULTI-THREADED FILE SYSTEM SCANNER FOR SERIALIZING FILE SYSTEM METADATA EXOSKELETON

(71) Applicant: Quantum Corporation, San Jose, CA (US)

(72) Inventors: Tim Barry, Minneapolis, MN (US); Stephen Lord, Prior Lake, MN (US)

(73) Assignee: Quantum Corporation, San Jose, CA (US)

(*) Notice: Subject to any disclaimer, the term of this patent is extended or adjusted under 35 U.S.C. 154(b) by 725 days.

(21) Appl. No.: 14/922,432

(22) Filed: Oct. 26, 2015

(65) Prior Publication Data

US 2016/0224581 A1 Aug. 4, 2016

Related U.S. Application Data

(60) Provisional application No. 62/110,631, filed on Feb. 2, 2015.

(51) Int. Cl.
*G06F 7/00* (2006.01)
*G06F 16/13* (2019.01)

(52) U.S. Cl.
CPC ...... *G06F 16/13* (2019.01); *G06F 2212/1041* (2013.01)

(58) Field of Classification Search
CPC .............................. G06F 2212/1041
USPC ........................................ 707/693
See application file for complete search history.

(56) References Cited

U.S. PATENT DOCUMENTS

| | | | | |
|---|---|---|---|---|
| 6,199,082 B1* | 3/2001 | Ferrel | ........... | G06F 16/958 715/205 |
| 6,934,749 B1* | 8/2005 | Black | ........... | G06F 1/14 709/217 |
| 7,379,945 B1* | 5/2008 | Hirsch | ........... | G06F 17/2241 |
| 8,060,857 B2* | 11/2011 | Biggerstaff | ........... | G06F 8/76 717/106 |
| 8,996,563 B2* | 3/2015 | Bender | ........... | G06F 9/546 707/769 |
| 9,092,314 B2* | 7/2015 | Roy | ........... | G06F 11/006 |
| 9,350,800 B2* | 5/2016 | Lang | ........... | H04L 67/34 |
| 9,367,601 B2* | 6/2016 | Babu | ........... | G06F 11/3404 |
| 9,800,608 B2* | 10/2017 | Korsunsky | ........... | G06F 21/55 |

(Continued)

*Primary Examiner* — Eliyah S. Harper
(74) *Attorney, Agent, or Firm* — Eschweiler & Potashnik, LLC

(57) ABSTRACT

Methods, apparatus, and other embodiments facilitate discovering and serializing metadata for a file system. After initializing or accessing a serialization data structure, recursive search threads that begin at a selected location in the file system are spawned. The threads analyzes the selected location in the file system, acquire metadata associated with the selected location in the file system, serialize the metadata associated with the selected location in the file system into the serialization data structure, and then selectively spawn additional recursive search threads. Additional recursive search threads may be spawned upon determining that the current recursive search thread has reached a branch point in a hierarchy of the file system. Different threads may perform different types of searches (e.g., depth-first breadth-first) and may operate in parallel. The serialization data structure may be persisted and surfaced in an object (e.g., JSON object) that can be queried or searched.

17 Claims, 8 Drawing Sheets

(56) References Cited

U.S. PATENT DOCUMENTS

| | | | |
|---|---|---|---|
| 9,916,336 B2* | 3/2018 | Harari | G06F 16/2246 |
| 10,255,302 B1* | 4/2019 | Cosic | G06F 3/011 |
| 10,310,945 B2* | 6/2019 | Prabhu | G06F 16/122 |
| 2008/0195615 A1* | 8/2008 | Rowley | G06F 16/1837 |
| 2008/0271042 A1* | 10/2008 | Musuvathi | G06F 11/3688 |
| | | | 718/108 |
| 2009/0006329 A1* | 1/2009 | Cong | G06F 17/2229 |
| 2009/0089720 A1* | 4/2009 | Nequist | G06F 17/5045 |
| | | | 716/100 |
| 2010/0082930 A1* | 4/2010 | Jiva | G06F 12/0269 |
| | | | 711/166 |
| 2011/0119481 A1* | 5/2011 | Auradkar | G06F 21/602 |
| | | | 713/150 |
| 2012/0254597 A1* | 10/2012 | Delling | G06F 17/11 |
| | | | 712/233 |
| 2012/0290950 A1* | 11/2012 | Rapaport | H04L 51/32 |
| | | | 715/753 |
| 2013/0036117 A1* | 2/2013 | Fisher | G06F 16/487 |
| | | | 707/736 |
| 2014/0149464 A1* | 5/2014 | Kahle | G06F 16/9027 |
| | | | 707/797 |
| 2014/0214852 A1* | 7/2014 | Serebrennikov | G06F 17/277 |
| | | | 707/741 |
| 2015/0088844 A1* | 3/2015 | Stigsen | G06F 16/2365 |
| | | | 707/703 |

* cited by examiner

RECURSIVE MULTI-THREADED FILE SYSTEM SCANNER FOR SERIALIZING FILE SYSTEM METADATA EXOSKELETON

CROSS REFERENCE TO RELATED APPLICATIONS

This application claims the benefit of U.S. Provisional Application 62/110,631 filed Feb. 2, 2015.

BACKGROUND

A conventional file system may store data and metadata for files. A shared disk file system may store data and metadata for billions of files. Designers of conventional systems may have never imagined having to handle so many files and thus new and emerging systems that are three or four orders of magnitude larger than conventional systems challenge conventional approaches to certain file system activities. Conventional algorithms, approaches, and apparatus for interacting with file systems have suffered from increasing performance degradation as file systems grow ever larger. Some file system operations may take hours, days or even weeks to perform, which may be unacceptable for real time operations.

A storage manager may interact with a shared disk file system. The storage manager may provide functionality associated with the file system including a data mover and a policy engine. The storage manager may therefore provide a policy based data management system that can copy, migrate, archive, or perform other actions for the shared disk file system. The shared disk file system and the storage manager may perform these tasks while providing a file locking storage area network (SAN) that provides access to files using a single namespace. A storage manager may be unwilling or unable to function when certain file system operations take too long.

The functionalities (e.g., data mover, policy engine) associated with the storage manager and the shared disk file system need to be able to find metadata associated with the shared disk file system, to use metadata associated with the shared disk file system, to react to metadata associated with the shared disk file system, and to perform other actions, all in a relevant time frame. Conventionally, it may have taken hours days, or even weeks just to traverse the metadata "exoskeleton" of a large file system. During this over long period of time, the file system would be changing, making the metadata that is acquired less valuable since it may be out-of-date. Thus, a current problem in computer science in general and in data storage and file systems in particular is retrieving metadata for an extremely large (e.g., 10 s of billions of files) shared disk file system or other file system in a practical and relevant time period.

BRIEF DESCRIPTION OF THE DRAWINGS

The accompanying drawings, which are incorporated in and constitute a part of the specification, illustrate various example apparatus, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
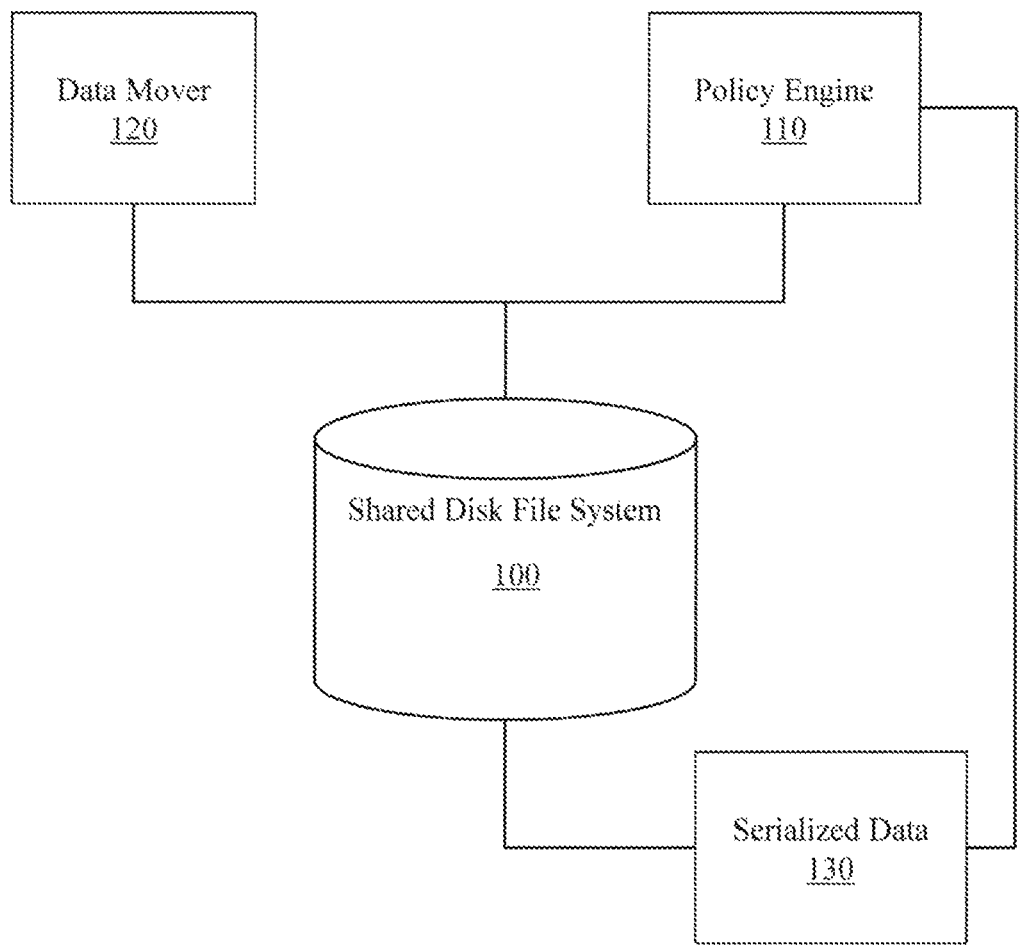
FIG. 1 illustrates a shared disk file system.

Example methods and apparatus improve on conventional approaches that employ a single breadth-first or depth-first approach to scanning file system metadata. Example apparatus and methods perform a recursive multi-threaded file system scan that serializes file system metadata. Example apparatus and methods then provide the ability to query the serialized file system metadata instead of having to query the file system itself. The serialized file system metadata may be made available to applications and processes including data movers and policy engines so that they can interact with all or a portion of the file system metadata without having to interact with the underlying file system.

In one embodiment, file system metadata may be parsed out of a file system up to 200 times as fast as conventional systems. In one embodiment, file system metadata may be parsed out at rates of approximately 500 k files per second, 1 million files per second, or 2 million files per second or more. Operating at these speeds, example apparatus and methods may provide a standing picture of a river of metadata. Certain operations may be performed much more efficiently on the standing picture than on the actual in-situ metadata. For example, understanding properties of the file system hierarchy like average directory depth, average directory breadth, average number of files in a directory, maximum directory depth, maximum directory breadth, maximum number of files in a directory, minimum directory depth, minimum directory breadth, minimum number of files in a directory, average file size, maximum file size, minimum file size, owner of the most number of files, number of different file types, and other information may be more efficiently acquired from the serialized metadata rather than from the in-situ metadata.

Example apparatus and methods may perform a recursive file system traversal that selectively spawns a new thread at a branch point in the file system. Newly spawned threads may continue the recursive file system traversal and continue to spawn new threads. The threads will visit desired portions of a file system and make metadata from the portions available to a serialization process. In one embodiment, the threads may visit all the portions of the file system and make all the metadata available to a serialization process. In one embodiment, the threads may visit less than all portions of the file system and may make less than all the metadata available to a serialization process. For example, one traversal may seek only hierarchy structure information (e.g., ancestry, descendants) while another traversal may seek only file information (e.g., sizes, owners). The metadata may include, for example, hierarchy information (e.g., ancestors, descendants), unique identifiers, file information (e.g., name, owner, type, size, permissions, structure, access history) or other information. Trees and sub-trees associated with a hierarchy may be pushed onto a stack where they can be accessed by additional threads operating opportunistically in parallel. Threads may operate in parallel to provide improved performance.

The recursive file system traversal may include depth-first search threads and breadth-first search threads. The recursive file system traversal may select which type of thread to launch at a branch point based, at least in part, on information available at the branch point. For example, information available at a branch point may indicate that a branch path is a terminal path and thus a breadth-first search thread may be launched. Or, information available at a branch point may indicate that the branch path is the top of a hierarchy of sub-directories that are deeper than a threshold and thus depth-first search threads may be launched. In one embodiment, branch paths may be analyzed and different types of search threads may be launched for different branch paths based on information about the branch path. For example, a breadth-first search thread may be launched for a first branch path while a depth-first search thread may be launched for a second branch path.

Example apparatus and methods may serialize the file system metadata. Serializing the file system metadata has the effect of serializing the file system tree. The serialized tree or the extracted metadata may be persisted in, for example, an object (e.g., Java Script Object Notation (JSON) object). Persisting the metadata or the serialized tree facilitates surfacing the file system metadata as, for example, an Internet standard object. Providing an Internet standard object facilitates providing a common metadata representation for different file systems (e.g., POSIX, shared disk, StorNext). Serializing the file system metadata facilitates performing queries on the metadata exoskeleton of the file system without having to interact with the file system itself. For example, queries may be made to the JSON object rather than on the file system. Queries to the JSON object or other representation of the serialized data may be performed much faster than queries to the actual file system.

In computer science, in the context of data storage, serialization is the process of translating data structures or object state into a format that can be stored and then later reconstructed in the same or another computer environment. Rather than treating the underlying data as a hierarchy with structure, the serialized or flattened data may be treated as a serial stream of bits. The serial stream of bits associated with the translated items may be stored in, for example, a file, a memory, a buffer, an object, or other data structure or collection of data. The translated items may be transmitted over a computer network. When the resulting series of bits is reread according to the serialization format, it can be used to create a semantically identical clone of the original item. This process may be referred to as deserialization or rehydration.

Example apparatus and methods provide a solution to the computer specific problem of acquiring file system metadata for large file systems in a useful and relevant time frame. Rather than taking hours, days, or even weeks, example apparatus and methods may discover and persist information from a shared disk file system in less than one minute.

Example apparatus and methods provide a solution to the computer specific problem of understanding the structure of a file system in a useful and relevant time frame. The structure may be stored in a flattened or serialized data structure that may then be searched (e.g., queried) without having to search the file system itself.

Example apparatus and methods provide a solution to the computer specific problem of producing a separate set of data that can be queried to discover information about the file system so that the file system itself doesn't have to be queried.

Once the metadata structure for a file system is known, an inverse process of deserialization or "rehydrating" the flattened, serialized structure may be performed. Rather than building a file system using a single depth-first or breadth-first approach, the metadata structure may be built using a recursive multi-threaded approach that spawns new threads at branch points. The threads may populate, build, or otherwise "rehydrate" the file system metadata exoskeleton much faster than conventional systems.

FIG. 1 illustrates a shared disk file system 100 with which a policy engine 110 may interact. The policy engine 110 may control the actions of a data mover 120. The data mover 120 may be configured to copy data, to migrate data, to archive data, or to perform other data movement operations that affect shared disk file system 100. The policy engine 110 may control when, how, or why the data mover 120 will perform an action. The policy engine 110 may make decisions about controlling the data mover 120 based on metadata associated with the shared disk file system 100. Before a decision that is based on metadata can be made, the policy engine 110 has to have access to the metadata associated with the shared disk file system 100. Conventionally, the policy engine 110 may have had to query the shared disk file system 100 for relevant metadata. As described above, this query may take an unacceptably long period of time.

Example apparatus and methods improve on conventional approaches by providing recursive multi-threaded scanning and serialization of metadata associated with the shared disk file system 100. The recursive multi-threaded scanning and serialization produces serialized data 130 that can be queried by the policy engine 110. This facilitates making better decisions about controlling the data mover 120. Decisions may be better because the serialized data 130 may be more up-to-date and may be more complete. The serialized data 130 may be more up-to-date because it takes much less time to acquire the metadata, which reduces the probability that the data will be out-of-date. The serialized data 130 may be more complete because more data can be acquired in the time allotted by the policy engine 110 for making a decision. Thus, example apparatus improve efficiency for shared disk file system 100 and policy engine 110 by acquiring metadata much faster than conventional systems and by providing a searchable serialized output (e.g., persisted object). This problem only exists in computers and has only come into existence recently as file systems have grown exponentially in size. None of the operations performed by the example apparatus and methods can be performed in the human mind or by paper and pencil.

Figure 2:
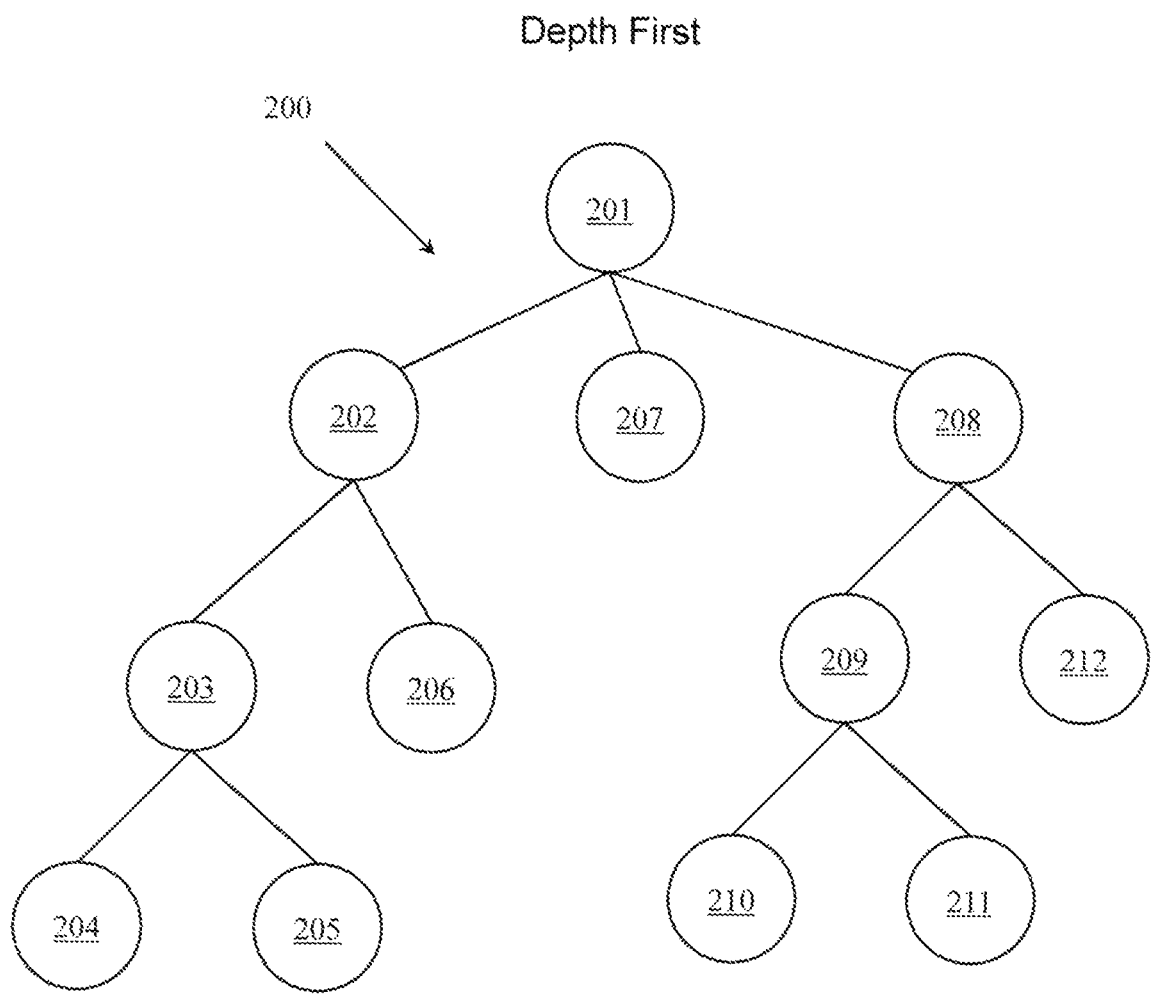
FIG. 2 illustrates a depth-first search.

FIG. 2 illustrates a depth-first search. A hierarchy 200 is illustrated. Hierarchy 200 has a root node 201. The nodes in hierarchy 200 are numbered in the order in which they would be visited by a conventional single-threaded left-first depth-first search. While a single-threaded depth-first search is suitable for some applications, it may not be suitable for scanning metadata in a large file system. Conventional systems may scan a file system using a single threaded depth-first search.

Figure 3:
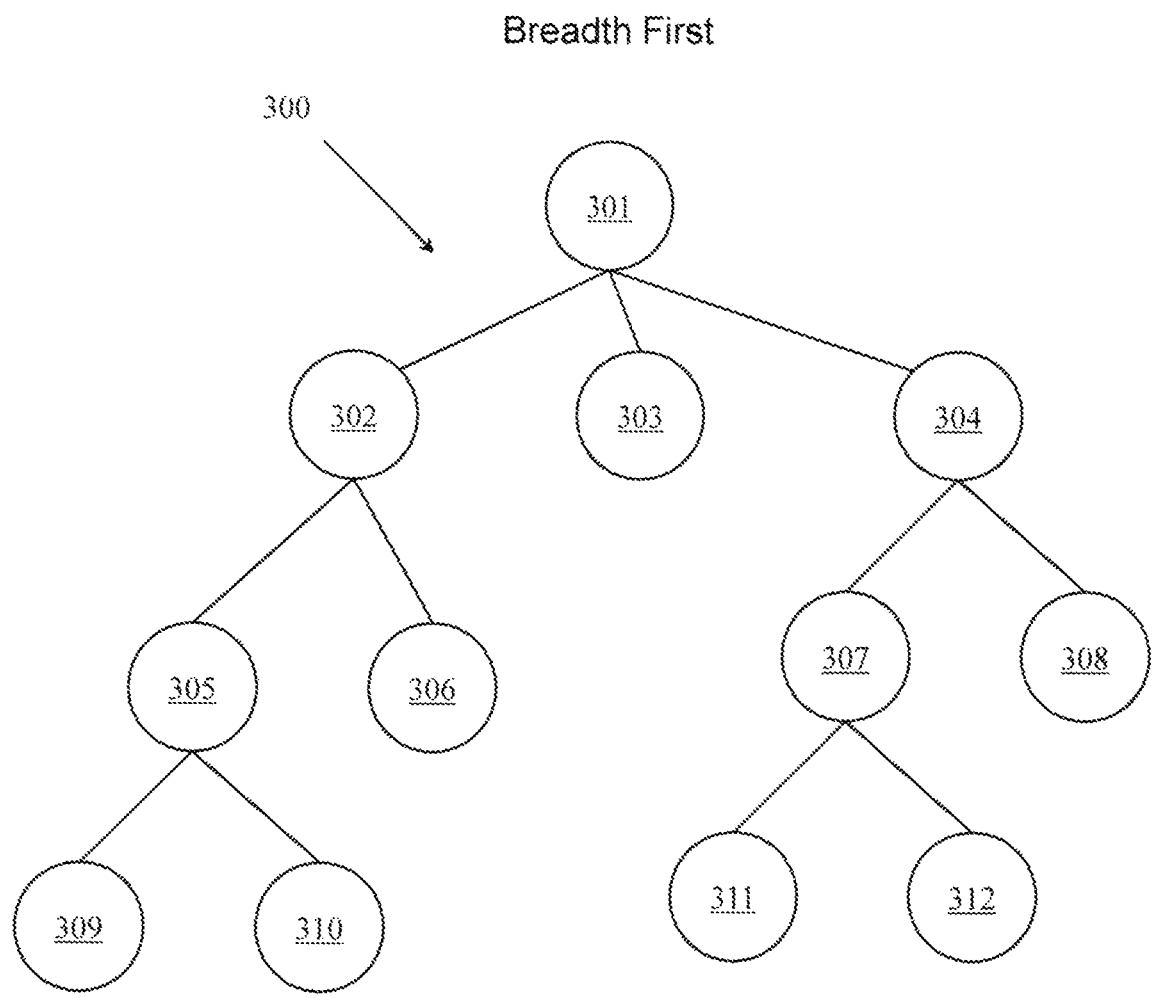
FIG. 3 illustrates a breadth-first search.

FIG. 3 illustrates a breadth-first search. Hierarchy 300 is illustrated. Hierarchy 300 also has a root node 301. The nodes in hierarchy 300 are numbered in the order in which they would be visited by a conventional single-threaded left-to-right breadth-first search. While a single-threaded breadth-first search is suitable for some applications, it may not be suitable for scanning metadata in a large file system. Conventional systems may scan a file system using a single threaded breadth-first search.

Figure 4:
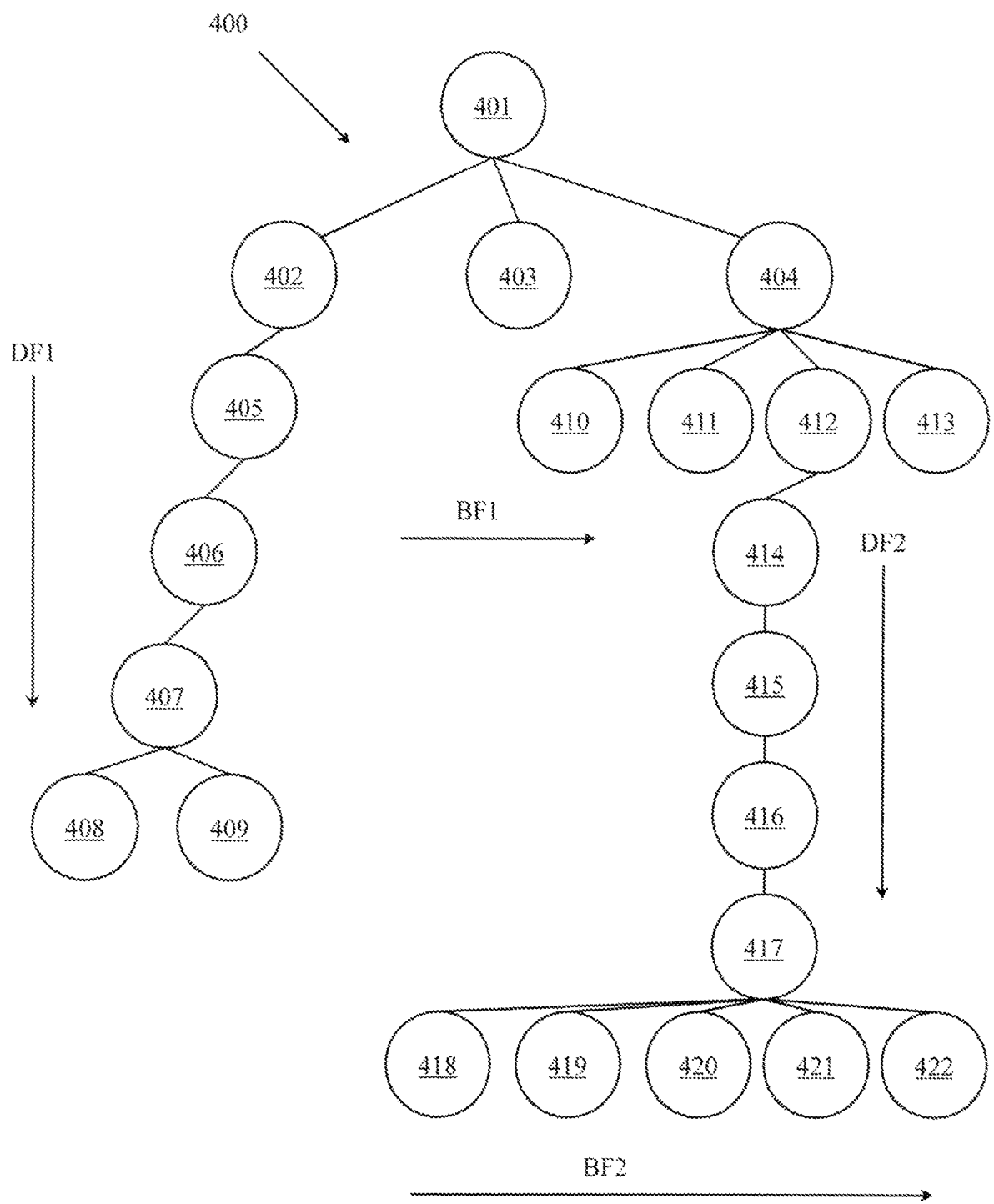
FIG. 4 illustrates an example hierarchy to which a recursive, multi-threaded file system scanner may be applied.

FIG. 4 illustrates a hierarchy 400 and an example multi-threaded search. The multi-threaded search may be a multi-modal search. The multi-threaded search may start at root node 401. After determining that node 401 has more than a threshold number of descendants, two new threads may be spawned. A first depth-first search thread DF1 may be spawned to investigate the branch path from 402 down. A first breadth-first search thread BF1 may be spawned to investigate the branch point from 404 down. The original thread may then analyze node 403.

The first depth-first search thread DF1 may analyze nodes 405-409 without spawning any additional threads because the fan out at any node is less than a threshold. The first breadth-first search may analyze nodes 404 and 410-413 and may spawn an additional depth-first search DF2 to analyze nodes in the path below node 412. This additional depth-first search may analyze nodes 412-417 and then spawn an additional breadth-first search BF2 to analyze nodes 418-422.

Since the threads may operate in parallel, the exact order in which nodes may be visited may not be determined a priori. Thus the node numbers in FIG. 4 do not correspond to the order in which nodes will be visited. Regardless of the order in which the nodes are visited, metadata discovered at the nodes may be serialized into a persistent object. Queries about file system metadata may then be presented to the persistent object instead of the file system itself. Queries may be satisfied much more quickly from the serialized data in the persistent object than from the file system itself.

The detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physic& manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 5:
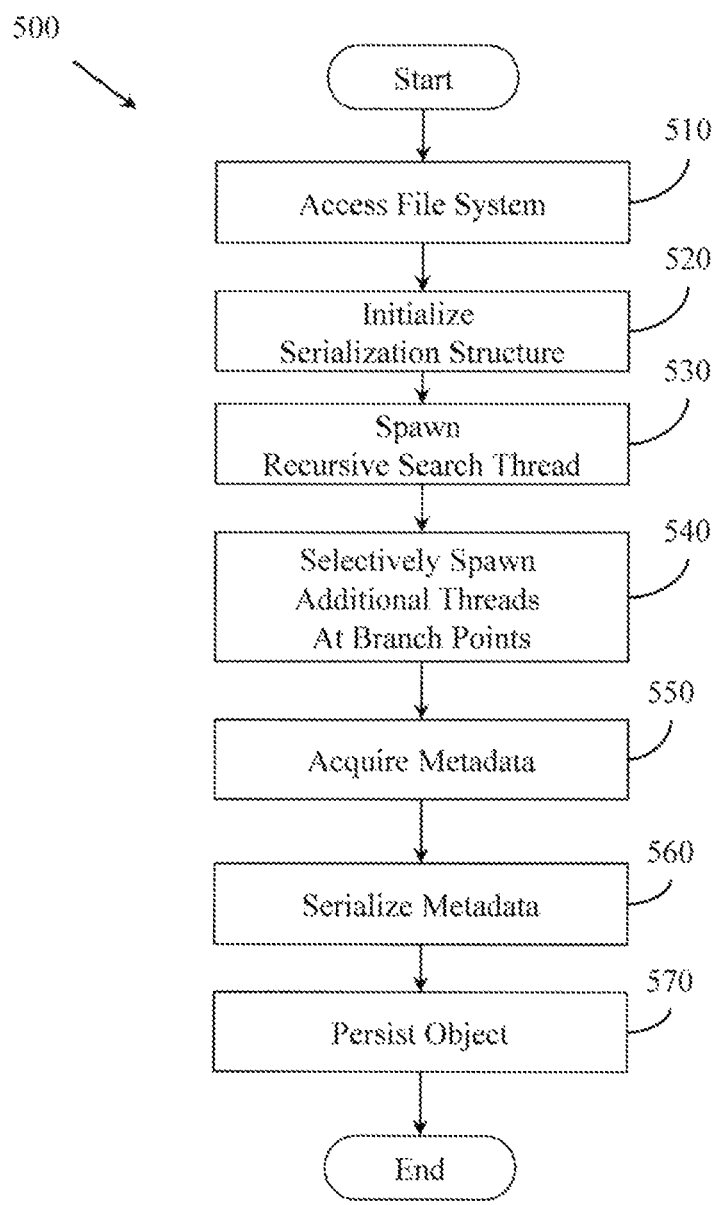
FIG. 5 illustrates an example method associated with a recursive, multi-threaded file system scanner for serializing file system metadata.

FIG. 5 illustrates an example method 500 associated with a recursive, multi-threaded file system scanner for serializing file system metadata. Method 500 includes, at 510, accessing the file system. Accessing the file system may include reading from a computer memory, reading data on a data storage device (e.g., disk, tape, solid state drive (SSD)), establishing a connection (e.g., socket, pipe) with a data provider, making a procedure call, interfacing with an application programming interface, or other computer-based action. A file system may not be accessed in the human mind or by paper and pencil because a file system is a collection of related electronic data stored in a computer or on a data storage device. In one embodiment, the file system may be a shared disk file system. In one embodiment, the file system may be a file locking storage area network file system. In one embodiment, the file system may be a shared disk file system that provides filing locking and a single namespace for the file system in a storage area network configuration.

Method 500 also includes, at 520, initializing a serialization data structure. Initializing the serialization data structure may include reserving space in a computer memory, reserving space on a data storage device (e.g., disk, tape, SSD), making a call to a serialization data structure thread or process, making a request to an object broker, or other computerized action. Once the serialization data structure has been initialized it may be ready to receive serialized metadata associated with the file system.

Method 500 also includes, at 530, spawning a current recursive search thread that begins at a selected location in the file system. Spawning the recursive search thread may involve making a procedure call, making a request to an operating system, or other computerized action. In one embodiment, the current recursive search thread may be either a depth-first search thread or a breadth-first search thread. The current recursive search thread may analyze the selected location in the file system. Analyzing the selected location may include identifying metadata associated with the selected location, identifying branch paths available from the selected location, or other actions. Analyzing the selected location may provide information upon which a decision concerning the type of search thread to spawn may be based. For example, the metadata may help determine whether the recursive search thread is a depth-first search thread or a breadth-first search thread.

Method 500 also includes, at 540, selectively spawning an additional recursive search thread upon determining that the current recursive search thread has reached a branch point in a hierarchy of the file system. The additional recursive search thread will begin at a selected node in a branch path available at the branch point. The selected node may be, for example, a descendant of the node currently being analyzed, Metadata associated with the node currently being analyzed may provide information upon which a decision concerning the next type of thread to spawn. For example, the metadata may help determine whether the additional recursive search thread is a depth-first search thread or a breadth-first search thread.

Method 500 also includes, at 550, acquiring metadata associated with the selected location in the file system. Acquiring the metadata may include, for example, reading a value from a computer memory, reading a value from a data storage device (e.g., disk, tape, SSD), receiving a value in a procedure call, receiving a value from the cloud, or other computer based activity. The metadata may include different types of information. For example, the metadata may include hierarchy information, file information, or other information.

Method 500 also includes, at 560, serializes the metadata associated with the selected location in the file system into the serialization data structure. Serializing the metadata may involve writing the data to the serialization data structure, providing the metadata to a process that will update the serialization data structure, or other computerized action. While actions 540, 550, and 560 are illustrated operating sequentially, threads that perform instances of actions 540, 550, and 560 may be operating in parallel.

Method 500 also includes, at 570, persisting the serialization data structure in an object. Persisting the serialization data structure includes storing the electronic data or metadata associated with the serialization data structure in a non-tangible computer-readable memory. In one embodiment, the object is a Javascript object notation (JSON) object. Other object types may be employed.

Figure 6:
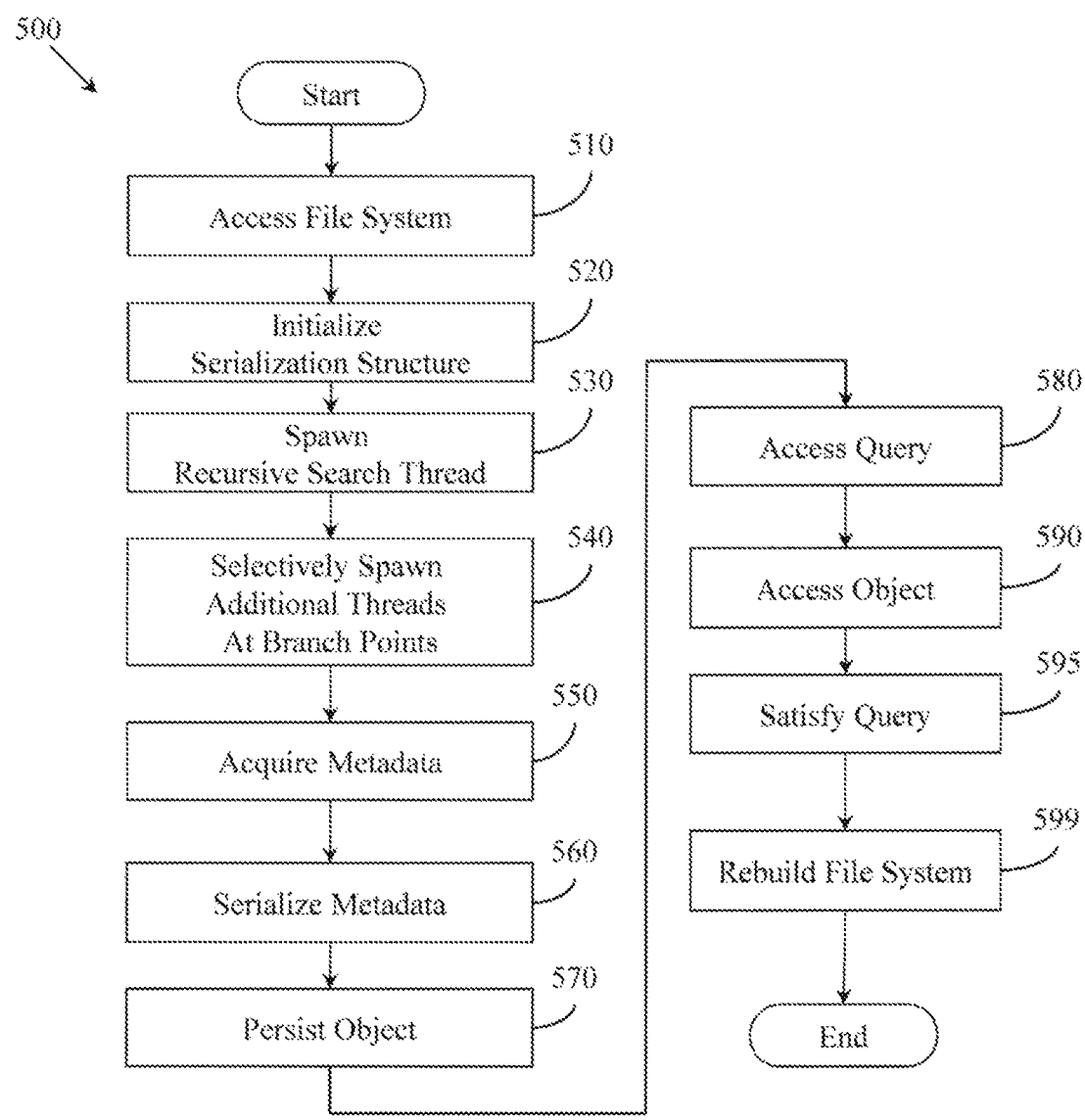
FIG. 6 illustrates an example method associated with a recursive, multi-threaded file system scanner for serializing and de-serializing file system metadata.

FIG. 6 illustrates another embodiment of method 500. This embodiment also includes, at 580, accessing a query concerning the file system. Accessing the query concerning the file system may include receiving a procedure call from an application, reading a query stored in a computer memory, popping a query off a stack, receiving information through an application programming interface, or other computer-related action.

This embodiment also includes, at 590, accessing the object. Accessing the object may include reading data from a computer memory or data storage device (e.g., disk, tape, SSD), establishing a connection with an object broker, making a procedure call, or other computer-related action.

This embodiment also includes, at 595, satisfying the query from information in the object without accessing the file system. Satisfying the query may include locating information that is sought by the query and providing the information to the entity that produced the query. Instead of looking in the file system for the information sought by the query, method 500 will look in the object that was persisted at 570.

This embodiment also includes, at 599, rebuilding a portion of the file system from the object using a recursive, multi-threaded builder. The recursive multi-threaded builder may spawn a current recursive build thread that begins at a first location in the file system. The recursive build thread may acquire metadata associated with the first location in the file system from the object and then populate the first location in the file system with the metadata associated with the first location in the file system. The recursive multi-threaded builder may then selectively spawn an additional recursive build thread upon determining that the current recursive build thread has reached a build branch point in the hierarchy of the file system. The additional recursive build thread may begin at a second node in a branch path associated with the build branch point.

While FIGS. 5 and 6 illustrate various actions occurring in serial, it is to be appreciated that various actions illustrated in FIG. 5 or 6 could occur substantially in parallel. By way of illustration, a first process could spawn recursive search threads, a second process could serialize metadata, and a third process could persist an object that stores the serialized metadata. While four processes are described, it is to be appreciated that a greater or lesser number of processes could be employed and that lightweight processes, regular processes, threads, and other approaches could be employed.

In one example, a method may be implemented as computer executable instructions. Thus, in one example, a non-transitory computer-readable storage medium may store computer executable instructions that if executed by a machine (e.g., computer) cause the machine to perform methods described or claimed herein including method 500. While executable instructions associated with the listed methods are described as being stored on a computer-readable storage medium, it is to be appreciated that executable instructions associated with other example methods described or claimed herein may also be stored on a computer-readable storage medium. In different embodiments, the example methods described herein may be triggered in different ways. In one embodiment, a method may be triggered manually by a user. In another example, a method may be triggered automatically.

In one embodiment, a non-transitory computer-readable storage medium may store computer executable instructions that when executed by a computer control the computer to perform a method for serializing file system metadata into a persistent object. The method may include establishing a start point for a recursive, multi-threaded, multi-modal search thread. The start point may be the root of the hierarchy or may be other non-root locations. Non-root locations may be desired when just a portion of the file system is to be analyzed, serialized, and persisted in an object. The method may also include launching the recursive, multi-threaded, multi-modal search thread at the start point. The recursive, multi-threaded, multi-modal search thread may launch other threads at other locations in the hierarchy. The method may also include serializing data produced by the recursive, multi-threaded, multi-modal search thread and progeny threads launched by the recursive, multi-threaded, multi-modal search thread into an object.

Figure 7:
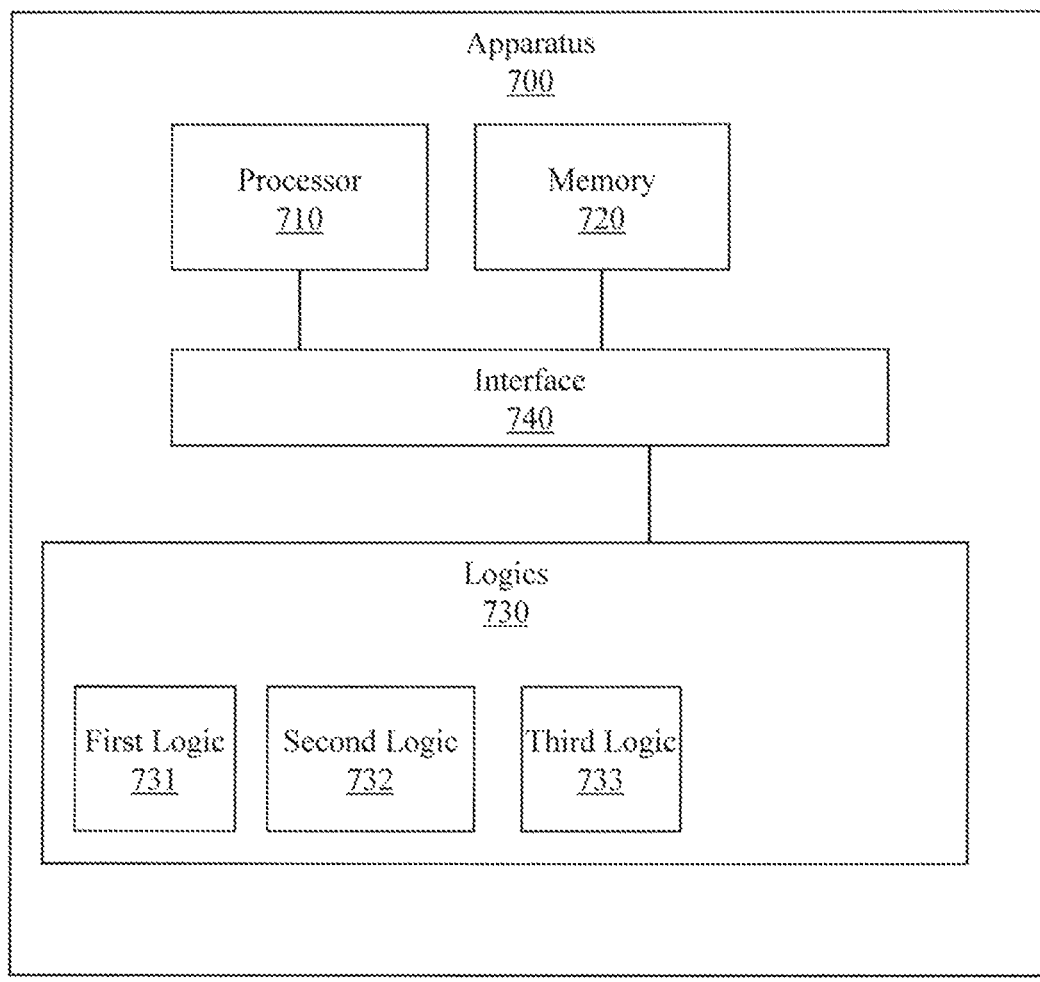
FIG. 7 illustrates an example apparatus associated with a recursive, multi-threaded file system scanner for serializing file system metadata.

FIG. 7 illustrates an example apparatus 700 associated with a recursive multi-threaded file system scanner for serializing file system metadata. Apparatus 700 includes a processor 710, a memory 720, a set of logics 730, and an interface 740 that connects the processor 710, the memory 720, and the set of logics 730. The set of logics 730 includes a first logic 731, a second logic 732, and a third logic 733. In one embodiment, the functionality associated with the set of logics 730 may be performed, at least in part, by hardware logic components. The hardware logic components may include but are not limited to, field-programmable gate arrays (FPGAs), application specific integrated circuits (ASICs), application specific standard products (ASSPS), system on a chip systems (SOCs), graphic processing units (CPUs), or complex programmable logic devices (CPLDs). In one embodiment, individual members of the set of logics 730 are implemented as ASICs or SOCs.

Memory 720 may store information concerning a multi-threaded traversal of the file system. The information may include, for example, a starting point for the traversal, a list or other compilation of nodes visited, and other information.

First logic 731 spawns a recursive thread. The recursive thread acquires metadata for locations in the file system visited by the recursive thread. The recursive thread also makes requests to the first logic to spawn an additional recursive thread at a branch point in a hierarchy of the file system. The request may cause a depth-first search thread to be spawned or a bread-first search thread to be spawned.

In one embodiment, the recursive thread is a depth-first search thread and the additional recursive thread(s) is a depth-first search thread. In another embodiment, the recursive thread is a breadth-first search thread and the additional recursive thread(s) is a breadth-first search thread. In another, multi-threaded, multi-modal embodiment, the recursive thread may be either a depth-first search thread or a breadth-first search thread and the additional recursive threads may be depth-first search threads or breadth-first search threads. In this embodiment, the first logic 731 chooses whether to spawn a depth-first search thread or a breadth-first search thread based, at least in part, on metadata associated with the branch point in the hierarchy of the file system.

Second logic 732 serializes metadata acquired by recursive threads spawned by the first logic 731 into an object. The object may be, for example, a JSON object. While a JSON object is described, other object types may be produced.

Third logic 733 persists and surfaces the object. Persisting the object includes storing the object in a location where it can reside for an indefinite period of time. Surfacing the object includes making the object available for access by other processes, threads, or applications.

Figure 8:
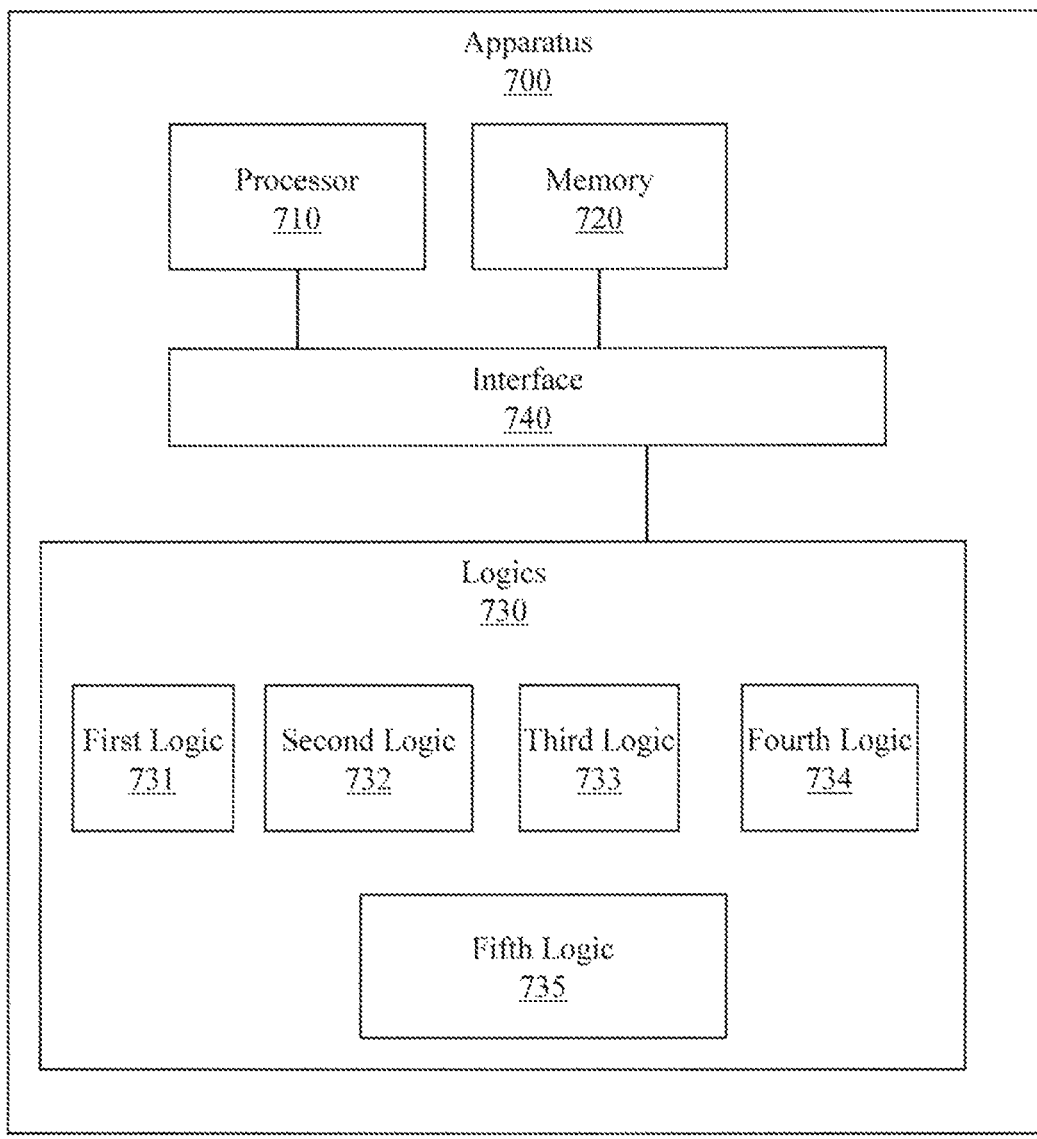
FIG. 8 illustrates an example apparatus associated with a recursive, multi-threaded file system scanner for serializing and de-serializing file system metadata.

FIG. 8 illustrates another embodiment of apparatus 700 that includes fourth logic 734 and fifth logic 735. Fourth logic 734 builds a copy of the file system from the object using a recursive tree building thread. The recursive tree building thread may access the object and start reading metadata. The recursive tree building thread may then build a hierarchy from the metadata. Additional tree building threads may be spawned at branch points identified in the metadata read from the object.

Fifth logic 735 satisfies a query concerning the file system metadata associated with the file system from the object. Conventional systems may receive queries concerning file system metadata and access the actual file system to retrieve the data. Since this may be an extremely slow process, the information returned by the query may be out-of-date before it is even provided to the requestor. Example apparatus improve the efficiency of a query by satisfying the query from the object rather than the file system.

References to "one embodiment", "an embodiment", "one example", and an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a non-transitory medium that stores instructions or data, "Computer-readable storage medium" does not refer to propagated signals. A computer-readable storage medium may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory, chip or card, a memory stick, and other media from which a computer, a processor or other electronic device can read.

"Logic", as used herein, includes but is not limited to hardware or firmware, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or Bbut not both" then the term "only A or B but not both" will be employed. Thus, use of the term "or" herein is the inclusive, and not the exclusive use. See, Bryan A. Garner, A Dictionary of Modern Legal Usage 624 (2d, Ed. 1995).

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A non-transitory computer-readable storage device storing computer executable instructions that when executed by a computer control the computer to perform a method for serializing metadata associated with a file system, the method comprising:

accessing the file system, where the file system is a shared disk file system or a file locking storage area network file system;

initializing a serialization data structure;

spawning a current recursive search thread that begins at a selected location in the file system, where the current recursive search thread:

analyzes the selected location in the file system, acquires metadata associated with the selected location in the file system, serializes the metadata associated with the selected location in the file system into the serialization data structure, and selectively spawns an additional recursive search thread upon determining that the current recursive search thread has reached a branch point in a hierarchy of the file system, where the additional recursive search thread begins at a selected node in a branch path available at the branch point.

2. The non-transitory computer-readable storage device of claim 1, comprising persisting the serialization data structure in an object.

3. The non-transitory computer-readable storage device of claim 2, where the object is a Javascript object notation (JSON) object.

4. The non-transitory computer-readable storage device of claim 1, where the current recursive search thread is a depth-first search thread or a breadth-first search thread and where the additional recursive search thread is a depth-first search thread or a breadth-first search thread.

5. The non-transitory computer-readable storage device of claim 1, comprising selecting whether the additional recursive search thread is a depth-first search thread or a breadth-first search thread based, at least in part, on metadata associated with the selected location in the file system.

6. The non-transitory computer-readable storage device of claim 1, comprising selecting whether the additional recursive search thread is a depth-first search thread or a breadth-first search thread based, at least in part, on metadata associated with the selected node in the branch path available at the branch point.

7. The non-transitory computer-readable storage device of claim 1, where the file system is a shared disk file system that provides filing locking and a single namespace for the file system in a storage area network configuration.

8. The non-transitory computer-readable storage device of claim 1, where the metadata includes hierarchy information or file information.

9. The non-transitory computer-readable storage device of claim 2, comprising:
accessing a query concerning the file system, and
satisfying the query from information in the object without accessing the file system.

10. The non-transitory computer-readable storage device of claim 2, comprising:
accessing the object, and
rebuilding a portion of the file system from the object using a recursive, multi-threaded builder.

11. The non-transitory computer-readable storage device of claim 10, where the recursive multi-threaded builder:
spawns a current recursive build thread that begins at a first location in the file system,
acquires metadata associated with the first location in the file system from the object,
populates the first location in the file system with the metadata associated with the first location in the file system, and
selectively spawns an additional recursive build thread upon determining that the current recursive build thread has reached a build branch point in the hierarchy of the file system, where the additional recursive build thread begins at a second node in a branch path associated with the build branch point.

12. An apparatus for serializing metadata associated with a file system, comprising:
a processor;
a memory that stores information concerning a multi-threaded traversal of the file system, where the file system is a shared disk file system or a file locking storage area network file system;
a set of circuits; and
an interface to connect the processor, the memory, and the set of circuits,
the set of circuits comprising:
a first circuit configured to spawn a recursive thread that is configured to:
acquire metadata for locations in the file system visited by the recursive thread, and
make a request to the first circuit to spawn an additional recursive thread at a branch point in a hierarchy of the file system,
a second circuit configured to serialize metadata acquired by recursive threads spawned by the first circuit into an object, and
a third circuit configured to persist and surface the object.

13. The apparatus of claim 12, comprising:
a fourth circuit configured to build a copy of the file system from the object using a recursive tree building thread.

14. The apparatus of claim 12, comprising a fifth circuit configured to satisfy a query concerning the file system metadata associated with the file system from the object.

15. The apparatus of claim 12, where the recursive thread is a depth-first search thread and where the additional recursive thread is a depth-first search thread.

16. The apparatus of claim 12, where the recursive thread is a breadth-first search thread and where the additional recursive thread is a breadth-first search thread.

17. The apparatus of claim 12, where the recursive thread is a depth-first search thread or a breadth-first search thread and where the additional recursive thread is a depth-first search thread or a breadth-first search thread, and where the first circuit chooses whether to spawn a depth-first search thread or a breadth-first search thread based, at least in part, on metadata associated with the branch point in the hierarchy of the file system.

* * * * *